United States Patent
Smith et al.

(10) Patent No.: US 6,898,344 B2
(45) Date of Patent: May 24, 2005

(54) FIBER OPTIC SWITCH ACTUATOR

(75) Inventors: Michael L. Smith, Jefferson City, TN (US); John Carberry, Talbot, TN (US); Roy Guynn, Blacksburg, VA (US)

(73) Assignee: Neptec Optical Solutions, Inc., Jefferson City, TN (US)

( * ) Notice: Subject to any disclaimer, the term of this patent is extended or adjusted under 35 U.S.C. 154(b) by 58 days.

(21) Appl. No.: 10/347,067

(22) Filed: Jan. 17, 2003

(65) Prior Publication Data

US 2003/0128915 A1 Jul. 10, 2003

Related U.S. Application Data

(63) Continuation-in-part of application No. 09/473,455, filed on Dec. 28, 1999, now Pat. No. 6,606,429.

(51) Int. Cl.[7] .............................. G02B 6/26; G02B 6/42
(52) U.S. Cl. .............................. 385/23; 385/18; 385/19
(58) Field of Search .......................... 385/16–24, 140, 385/147, 14–25

(56) References Cited

U.S. PATENT DOCUMENTS

| | | |
|---|---|---|
| 4,057,719 A | 11/1977 | Lewis |
| 5,133,030 A | 7/1992 | Lee |
| 5,175,780 A | 12/1992 | Sano et al. |
| 5,420,946 A | 5/1995 | Tsai |
| 5,542,013 A | 7/1996 | Kaplow et al. |
| 5,546,180 A | 8/1996 | Garel-Jones et al. |
| 5,742,712 A | 4/1998 | Pan et al. |
| 6,374,010 B1 | 4/2002 | Zafferri |
| 6,522,800 B2 * | 2/2003 | Lucero .................. 385/16 |
| 6,542,653 B2 * | 4/2003 | Wu et al. .............. 385/16 |
| 2002/0061159 A1 * | 5/2002 | Dahmani et al. ....... 385/18 |
| 2003/0231837 A1 * | 12/2003 | Jones et al. ............ 385/57 |

* cited by examiner

Primary Examiner—Akm Enayet Ullah
Assistant Examiner—Kevin S Wood
(74) Attorney, Agent, or Firm—Pitts & Brittian, P.C.

(57) ABSTRACT

An optical switch actuator moving an optical element into or out of an optical pathway. The optical element is coupled to a movable shuttle and driven by a motor between two rest positions. The motor includes two stationary coils and a magnet. The shuttle is magnetically latched in the rest positions. The optical element's position at the extended rest position is controlled with a stop that contacts the shuttle to provide accuracy and precision about multiple axes. The material used to construct the actuator's components aids in repeatedly positioning the optical element with precision.

34 Claims, 5 Drawing Sheets

FIBER OPTIC SWITCH ACTUATOR

CROSS-REFERENCE TO RELATED APPLICATIONS

This application is a Continuation-In-Part of Ser. No. 09/473,455, filed on Dec. 28, 1999 now U.S. Pat. No. 6,606,429.

STATEMENT REGARDING FEDERALLY SPONSORED RESEARCH OR DEVELOPMENT

Not Applicable

BACKGROUND OF THE INVENTION

1. Field of Invention

This invention pertains to an actuator for a fiber optical device. More particularly, this invention pertains to an assembly that linearly moves an optical element into an optical path thereby altering the optical path.

2. Description of the Related Art

In fiber optic networks, light signals are transmitted along optical fibers to transfer information from one location to another. Optical switches are used to selectively couple light from an input fiber to an output fiber. Optical fibers typically have very small cross-sections and narrow acceptance angles within which light entering the fiber must fall to promote efficient propagation of the light along the fiber. As such, optical switches must transfer light with precise alignment.

One type of electromechanical optical switch operates by moving a mirror while maintaining the optic fibers and optical pathway stationary. In response to electrical signals, a relay arm moves a mirror into and out of an optical pathway. The relay arm moves the mirror substantially parallel to its reflective surfaces. The travel of the relay arm along that axis is limited by stops that determine the position of the mirror. The relay arm is constrained at the stops by only a single contact point, thereby allowing inaccuracies in the radial position due to rotation of the arm. Examples of such switches include U.S. Pat. No. 5,133,030, issued to Lee on Jul. 21, 1992, entitled "Fiber Optic Switch Having a Curved Reflector," and U.S. Pat. No. 4,057,719, issued to Lewis on Nov. 8, 1977, entitled "Fiber Optics Electro-Mechanical Light Switch."

One problem with such a switch is that the relay mechanism may not be able to provide the accuracy and precision in positioning the mirror that may be required by some optical switching networks. Accuracy is the ability to achieve a desired position with any given movement. Precision is the ability to repeatedly achieve the same position over a number of movements, regardless of where that position is located. Because the movement of the relay arm is constrained by only a single point of contact with the stopper, the switch may only be able to provide accurate alignment along a single axis (in the direction of the arm's movement). The use of a single contact point may result in position inaccuracies due to the freedom of the relay arm to rotate about additional axes. Furthermore, relay mechanisms are typically constructed of materials that may be susceptible to significant wear from component contact through repeated use. Such material wear may lead to problems with precise placement of the mirror over time, in addition to position inaccuracies.

Another problem with electromechanical switches is that they use a large electromechanical actuator that may not permit the placement of mirrors in the packing density that may be required for multiple switch arrays.

Other types of systems use electromagnetic actuators, for example, disk drive systems. These systems typically use actuators to position drive components over different regions of a disk. One problem with such electromagnetic actuators is that they require a control servo loop in order to operate. With a servo loop, the position component must be actively adjusted to maintain proper positioning. As such, actuators of this type are unable to repeatedly return components to the same position when actuated, without the use of an active control loop. This adds complexity to a system's design and, thereby, may undesirably increase its cost.

BRIEF SUMMARY OF THE INVENTION

According to one embodiment of the present invention, an optical switch actuator is provided. The actuator includes an optical element, a shuttle, and a motor. The optical element, in one embodiment, includes a mirror. The shuttle moves longitudinally within a cylinder, which has a cylindrical stopper that contacts a flat on the shuttle, thereby precisely locating the optical element in the extended position. The shuttle is connected to the motor by a cable member. The motor includes two stationary cored coils with a magnet that moves between the two cores. The magnet is attracted to the core, thereby latching the shuttle in either of two positions.

In one embodiment the shuttle, the cylinder sleeve it moves within, and the stopper are made of a close grained ceramic material that has low coefficient of thermal expansion, is not susceptible to cold metal bonding or welding, and exhibits little wear with repeated use. The motor has a bearing and a bearing bushing made of the same material.

The stopper permits the optical element to have high repeatability by stopping the shuttle at a fixed point and inhibiting the shuttle from moving longitudinally and from moving about its longitudinal axis. The optical element is attached to the shuttle with an adhesive with a low coefficient of thermal expansion and contains micro-spheres, which allow the optical element to maintain alignment once positioned.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for moving an optical element 132 between an extended position and a retracted position is disclosed. The apparatus is an optical switch actuator 10 suitable for use in optical switches.

Figure 1:
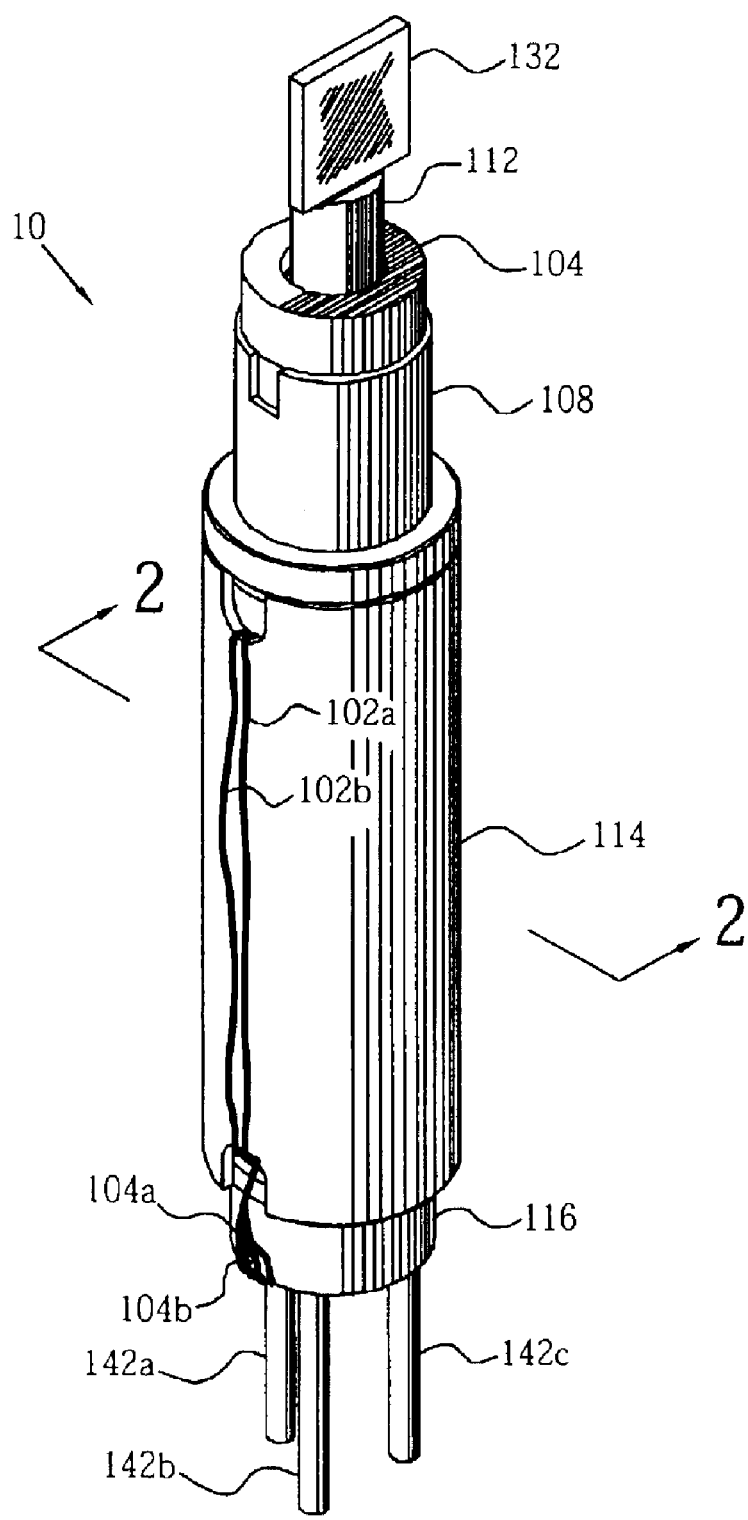
FIG. 1 is a perspective view of an optical switch actuator.

FIG. 1 illustrates the actuator 10, which has a cylindrical body 114 with electrical leads 142a, 142b, 142c at one end and an optical element 132 at the opposite end. The optical element 132 has illustrated in the extended position. In the retracted position, the optical element 132 is positioned closer to the end of the cylindrical body 114. A motor inside the cylindrical body 114 drives a shuttle 112, and the optical element 132, between the two positions. In one embodiment, the optical element 132 is a mirror. In another embodiment, the optical element 132 is a filter. In one embodiment, a wavelength division multiplexed (WDM) switch made with an optical element 132 being a partially reflective filter. The use of optical elements, such as mirrors and filters, to propagate light between fiber collimators is well known in the art; according, a more detailed discussion of their operation is not provided. As shown in FIG. 1, the optical element 132 is attached to the shuttle 112, which is constrained by a cover 104 and surrounded by a tube 108.

The electrical leads 142 are attached to a flange 116 located at one end of the cylindrical body 114. The electrical leads 142 are connected to a motor, or driver, in the cylindrical body 114. The motor, or driver, moves the shuttle 132 linearly between an extended position and a retracted position. In the extended position, the optical element 132 on the shuttle 132 interacts with an optical pathway and in the retracted position the optical element 132 is out of the optical pathway.

Figure 2:
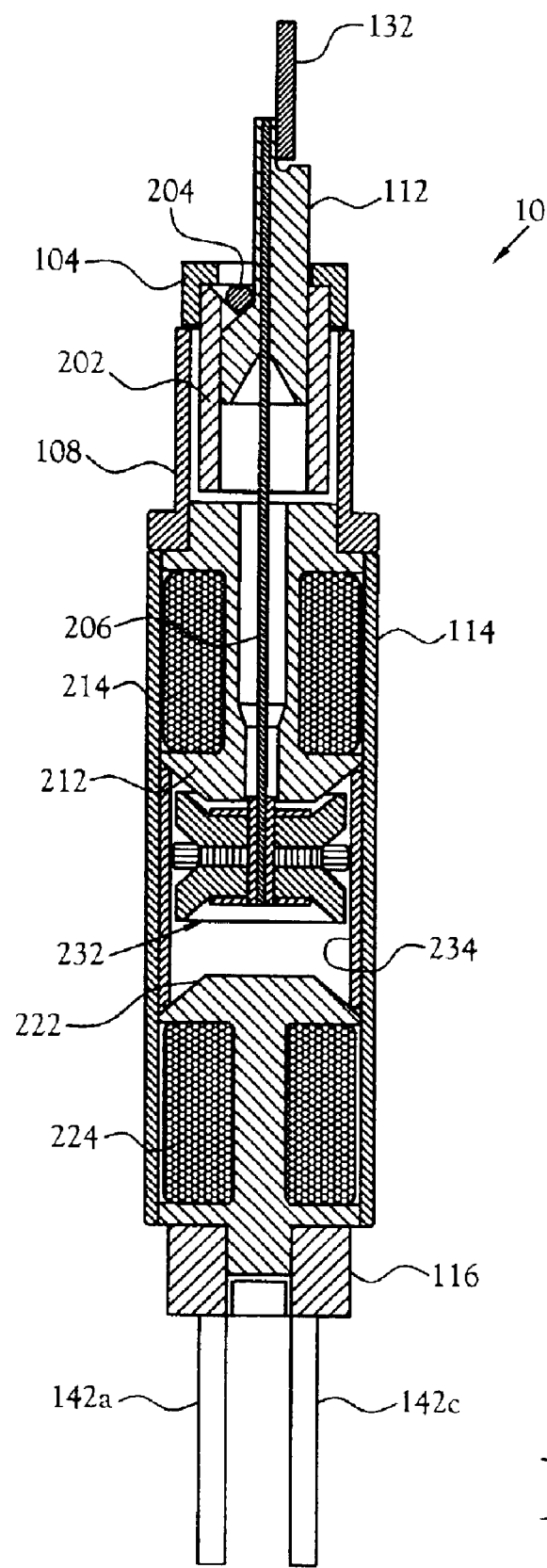
FIG. 2 is a cross-sectional view of the actuator.

Referring to FIG. 2, the motor includes a pair of electromagnets 214, 212 and 224, 222 and a plunger assembly 232. A pair of electrical conductors 102a, 102b connect the upper winding 214 to two of the electrical leads 142a, 142b and a second pair of electrical conductors 104a, 104b connect the lower winding 224 to two of the electrical leads 142b, 142c. In one embodiment, the electrical conductors 102a, 102b are lacquered to the cylindrical body 114. The electrical conductors 102a, 102b, 104a, 104b are connected to the electrical leads 142 by wrapping and then soldering the conductors 102a, 102b, 104a, 104b to the appropriate lead 142. The upper and lower designations are used only for convenience in referring to the orientation presented in the figures. Those skilled in the art will recognize that the actuator 10 can be used in any orientation without departing from the spirit and scope of the present invention.

FIG. 2 shows the actuator 10 in cross-section. Inside the cylindrical body 114 is the motor assembly, which includes an upper coil 214 wrapped around a hollow upper core 212, a lower coil 224 wrapped around a hollow lower core 222, and a plunger, or plunger assembly, 232 that moves between the upper core 212 and the lower core 222. The plunger assembly 232 is attached to a wire 206 connected to the shuttle 112. The plunger assembly 232 moves inside a bearing bushing 234.

The shuttle 112 moves within a cylindrical sleeve 202 between the extended and the retracted position. At the extended position, the shuttle 112 contacts a stopper 204, which prevents the shuttle 112 from moving further in longitudinal direction. The stopper 204 determines the accuracy with which the shuttle 112, and thereby the optical element 132, can be positioned. However, the wear of the shuttle 112 may affect the precision with which the optical element 132 can be repeatedly positioned.

The shuttle 112, the cylindrical sleeve 202, and the stopper 204 are constructed from a hard material having a small grain size, for example, ceramic. Ceramic may be polished to higher degree than softer materials such as plastics. When a material is polished, the grain size of the material determines its surface roughness and, thus, its surface area of contact. As a result, when materials come into contact with each other, the area of contact is determined by the grain size of the contacting materials. Materials having a small grain size will have a greater number of grain particles in contact with each other over a given surface area. As such, a smaller grain size results in more contact between the surface of the shuttle 112 and the cylindrical sleeve 202.

In one embodiment, for example, the grain size is approximately in the range of 0.3 to 0.5 microns and the distance of travel of shuttle 112 is approximately 2 millimeters. When materials having this grain size come into contact with each other, the contact accuracy may be approximately 0.2 microns. Such a contact accuracy over a distance of approximately 2 mm results in an angular accuracy of approximately 0.0001 radians.

The wear of the material results from the dislodging of surface grains, of which the size of the grains is one factor. The more grains that are dislodged, the greater the wear of the material. However, a large force is required to dislodge a grain of any given size. A surface material having a greater number of small gains will tend to have fewer gains dislodged than a material having a fewer number of larger grains. As such, due to the larger number of grain contacts with small grained surfaces, less discernable wear may result than with a material having a larger grain size.

In another embodiment, other fine grained materials that reduce wear on shuttle 112 and cylindrical sleeve 202 are used, for example, zirconia, silicon carbide, silicon nitride, and aluminum oxide. In yet another embodiment, shuttle 112 and cylindrical sleeve 202 are constructed from a metal or plastic material. If a larger grained material, such as a metal, is desired to be used, the speed at which shuttle 112 is moved is slowed to prevent the generation of forces that may increase the wear on shuttle 112 and cylindrical sleeve 202. However, the use of ceramics provides greater precision and switching speed than is attainable with larger grained materials. As such, the proper selection of the material for shuttle 112 and cylindrical sleeve 202 may aid in achieving a high precision and repeatability in the positioning of optical element 132. Grain size, however, is only one of several factors that may contribute to the wear resistance of a material. Other factors that may contribute to the wear resistance of a material include, for example, coefficients of friction, modulus of rapture, tensile strength, compressive strength, and fracture toughness. The operation of such factors is well known in the art; accordingly, a more detailed discussion is not provided.

Actuator 10 is not limited to only having components constructed from the materials described above. In an alternative embodiment, shuttle 112 and cylindrical sleeve 202 are coated with the materials described above. For example, shuttle 112 and cylindrical sleeve 202 are constructed of any rigid material and coated with a wear resistant ceramic such as titanium nitride or aluminum oxide. The coating is applied using techniques that are well known in the art, for example, chemical vapor deposition.

An advantage, other than wear resistance, to using a ceramic material for the interface between the shuttle 112, the cylindrical sleeve 202, and the stopper 204 is that ceramic is not susceptible to cold-metal bonding or welding. Cold-metal bonding occurs when two components in contact are placed under pressure, the more extreme the pressure, the greater the chance of cold-metal bonding occurring. Without cold-metal bonding, less motor power is required to overcome inertia and start the plunger assembly 232 and the shuttle 112 moving.

The cylindrical sleeve 202 is aligned with the plunger assembly 232 by the tube 108. The tube 108 has a central bore that is concentric with the outside edge of its flange, which has the same diameter as the cylindrical body 114. The tube 108 is secured to the body 114 and the cylindrical sleeve 202 is secured to the inside of the tube 108. In one embodiment adhesive is used to secure the tube 108 to the body 114 and the sleeve 202 to the tube 108. In another embodiment, the tube 108 is not used, and the cylindrical sleeve 202 is secured to the upper core 212. In another embodiment, the upper core 212 has an alignment recess or groove into which the cylindrical sleeve 202 is secured, without the tube 108, by an adhesive.

Figure 3:
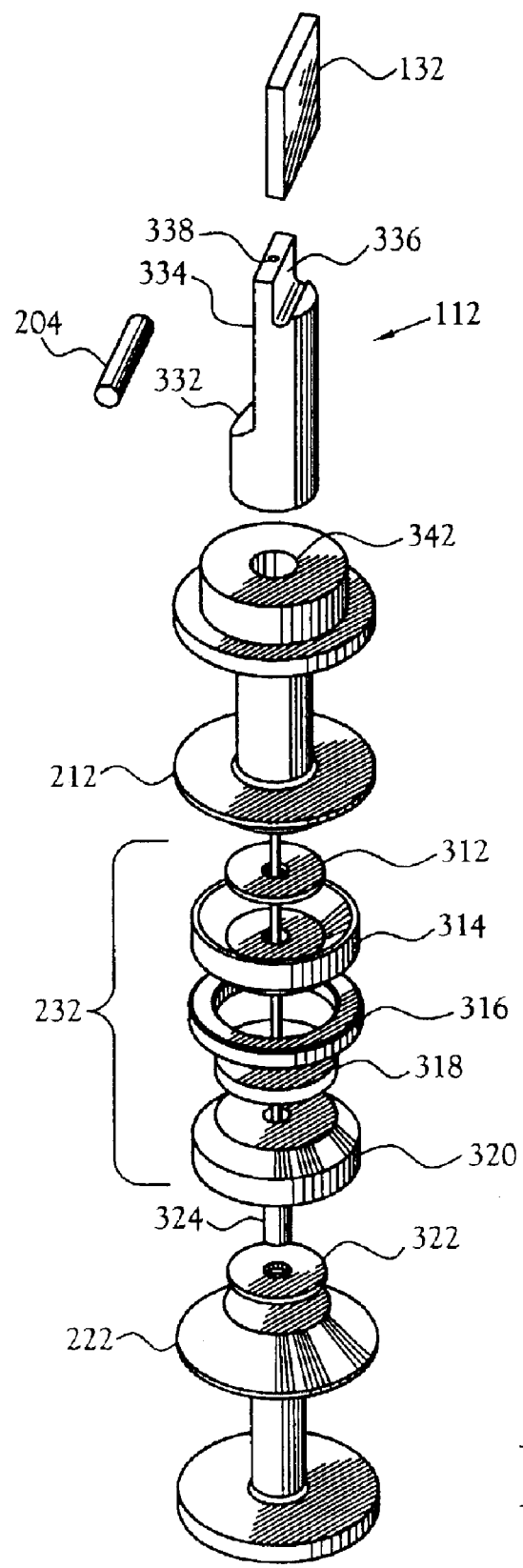
FIG. 3 is an exploded diagram showing the internal components of the actuator.

FIG. 3 illustrates an exploded view of the internal components of the actuator 10. The shuttle 112, in one embodiment, is an MU ferrule that is machined to have a first surface 336 for mounting the optical element 132 and a second surface 334 and an incline surface 332 for interfacing with the cylindrical stopper 204. The wire 206 extends from the bottom of the shuttle 112 to the top portion of the shuttle 112. In one embodiment, the wire 206 is secured to the shuttle 112 by an adhesive applied to the wire 206 before it is drawn into the shuttle 112.

The optical element 132 is secured to the first surface 336 with an adhesive. The optical element 132 attachment to the shuttle 112, along with the repeatability of the shuttle 112 location in the extended position, is critical. The precise alignment of the optical element 132 relative to the cylindrical body 114 is critical. Any misalignment can result in an attenuation of the optical signal or the loss of the signal. By matching the coefficient of thermal expansion of the individual components and adhesives, the components of the actuator 10 remain in alignment over a wide temperature range such that the optical path does not suffer degradation as the temperature varies. In one embodiment, the temperature range is from −40° to +85° Centigrade. In another embodiment, the transition point of the adhesive is outside the operating temperature range, which enhances the dimensional stability of the connection of the optical element 132 to the first surface 336. In one embodiment, keeping the transition point outside the operating range is accomplished by using fillers. In still another embodiment, the adhesive has limited shrinkage, which can be accomplished with a filler. Further, the adhesive can be cured in place. In one embodiment the adhesive is cured by ultraviolet light.

In one embodiment the adhesive is a quick curing adhesive blended with amorphous silica spheres of a selected diameter. The adhesive is compressed between the optical element 132 and the first surface 336, with the spheres forming a monolayer, which results in dimensional stability when the adhesive is cured. In another embodiment the adhesive is Dymax OP66LS, which has a coefficient of thermal expansion similar to that of the shuttle 112 such that the optical element 132 remains in alignment as the temperature varies within the operating range of the actuator 10.

In addition to the adhesive, the repeatability of the optical element 132 location relative to the cylindrical body 114 is achieved by the stopper 204 contacting the incline surface 332, which makes the shuttle 112 self-aligning. The stopper 204 is fixed in position by the cover 104 and the cylindrical sleeve 202. The stopper 204 contacts the incline surface 332 of the shuttle 112 which stops the shuttle 112 from extending further. Also, the stopper 204, by its length contacting the width of the incline surface 332, prevents the shuttle 112 from rotating within the cylindrical sleeve 202 in the fully extended position. Therefore, the interaction of the stopper 204 and the incline surface 332 serve to ensure that the optical element 132 position is highly repeatable when in the extended position.

Figure 5:
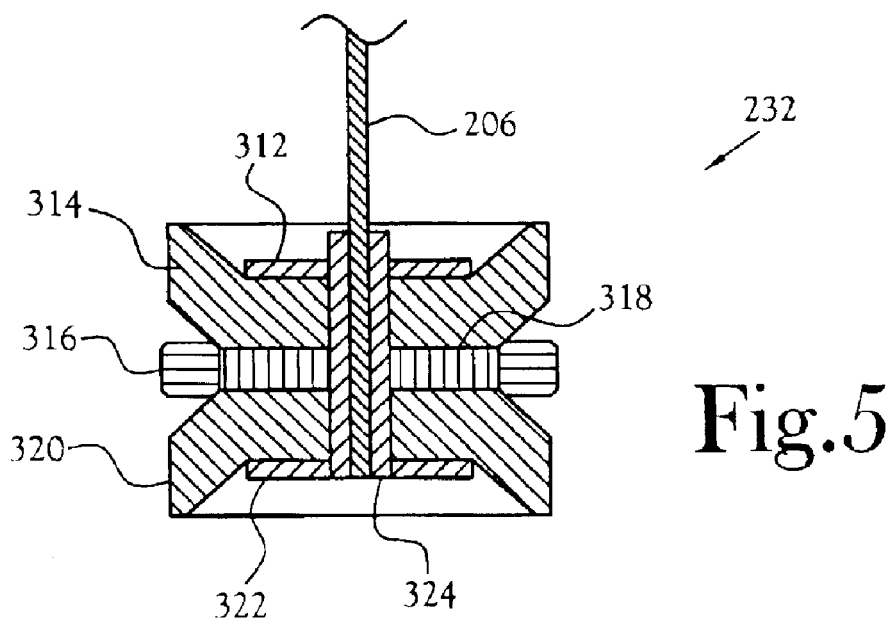
FIG. 5 is a cross-sectional view of the driven element of the motor.

FIG. 5 illustrates the plunger assembly 232 which is shown between the upper coil core 212 and the lower coil core 222 shown on FIG. 3. The plunger assembly 232 includes an upper armature 314 and a lower armature 320. Sandwiched between the upper and lower armatures 314, 320 are a permanent magnet 318 and a bearing 316. The bearing 316 is ring shaped and has an inside diameter greater than the outside diameter of the permanent magnet 318. The bearing 316 has an outside diameter greater than that of the upper and lower armatures 314, 320 and slightly less than the inside diameter of the bearing bushing 234. The outside edge of the bearing 316 slides along the inside surface of the bearing bushing 234. Both the bearing 316 and the bearing bushing 234, in one embodiment, are constructed from a hard material having a small grain size, for example, ceramic, as described above for the shuttle 112 and the cylindrical sleeve 202.

The plunger assembly 232 is held together by the central plunger 324, which has the wire 206 in its center. The central plunger 324 fits in a central opening in the upper and lower armatures 314, 320, permanent magnet 318, the upper washer 312 and the lower washer 322. In one embodiment, the central plunger 324 is sized for an interference fit with the central opening and is pressed into the openings, thereby securing the assembly 232. In another embodiment, the central plunger 324 is secured in the openings by an adhesive. In still another embodiment, the central plunger 324 is positioned in the openings and pressure is applied to its exposed ends, causing the central plunger 324 to expand.

The upper and lower washers 312, 322, in one embodiment, are constructed of a resilient material, such as nylon or an elastomer. In another embodiment, the washers 312, 322 are non-metallic. Resilient washers 312, 322 act as shock absorbers; thereby aiding in the long life of the actuator 10 by avoiding slamming the shuttle 112 into the stopper 204. The actuation pressure of the assembly 324 against the cores 212, 222, if the contact surfaces are metal-to-metal, can cold-weld the contact surface to each other. Resilient or non-metallic washers 312, 322 avoid cold-welding or sticking of the assembly 324 to the upper and lower cores 212, 222.

Figure 4:
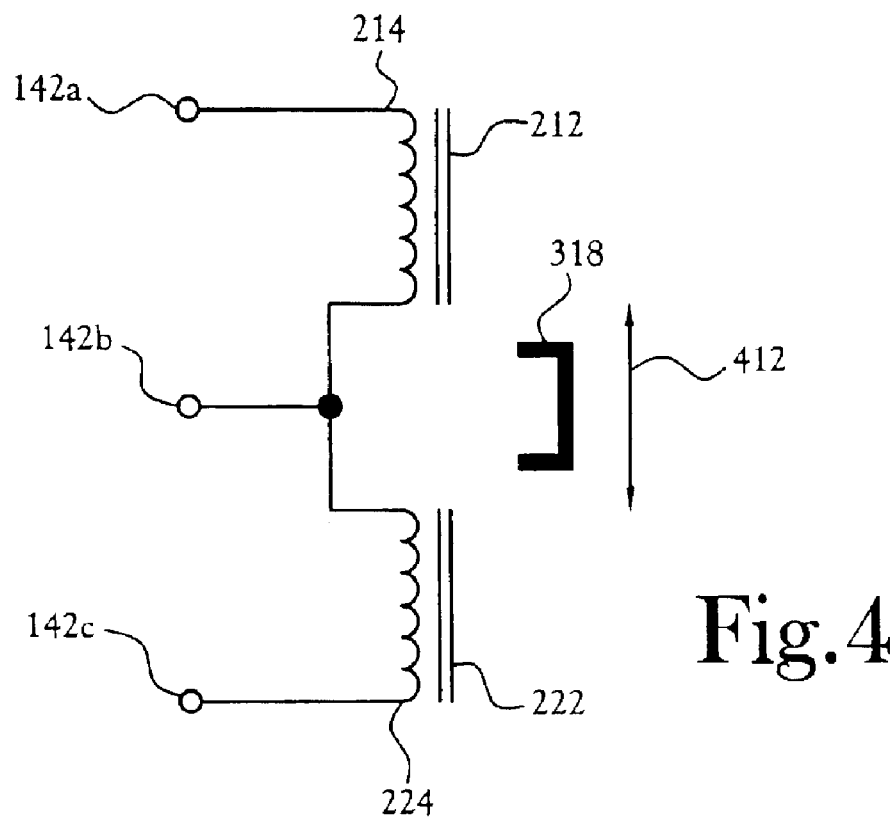
FIG. 4 is a schematic diagram of the actuator.

FIG. 4 illustrates the electrical schematic of the actuator 10. In operation, a direct current voltage is momentarily applied to electrical leads 142a, 142b, which energizes the upper coil 214 and causes the permanent magnet 318 to be attracted to the upper core 212. The movement of the permanent magnet is shown by the arrow 412 on FIG. 4. The voltage pulse causes the permanent magnet 318, and the plunger assembly 324, to move toward the upper core 214 and when the permanent magnet 318 is near the upper core 214, magnetic attraction latches the plunger assembly 324 in the extended position. The plunger assembly 324 is connected to the shuttle 112 via the wire 206. The shuttle 112 is constrained from extending by the stopper 204, which ensures that the shuttle 112 stops at the same point each time it is in the extended position. With the shuttle 112 constrained by the stopper 204 and the wire 206 being straight, the plunger assembly 324 does not make contact with the upper core 212. However, as the plunger assembly 324 moves between its two positions, the wire 206 flexes. This flexing serves to minimize any shock transmitted to the optical element 132 from the plunger assembly 324. In one embodiment, the wire is coated with a slick material, such as Teflon, so that, if the wire were to contact the inside surface of the upper core 212, the wire will slide with minimum friction.

A direct current voltage pulse applied to electrical leads 142b, 142c momentarily energizes the lower coil 224 and causes the permanent magnet 318 to be attracted to the lower core 222. The magnetic force induced in the lower core 222 overcomes the magnetic attraction of the permanent magnet 318 to the upper core 212 and causes the plunger assembly 232 to move toward the lower core 222. When the permanent magnet 318 approaches the lower core 222, the magnetic attraction to the lower core 222 pulls the plunger assembly 324 toward the core 222 until the lower washer 322 contacts the lower core 222. With the optical element 132 in the retracted position, the plunger assembly 324 is latched against the lower core 222 by the magnetic attraction of the permanent magnet 318 to the lower core 222. In one embodiment, the plunger assembly 232 is in contact with the core 212, 222. In another embodiment, there is an air gap between the plunger assembly 232 and the core 212, 222. In still another embodiment, a gap is created by the use of non-ferromagnetic washers 312, 322. The use of a gap reduces the power required for the coils 214, 224 to move the plunger assembly 232.

In another embodiment, a direct current pulse is applied to one coil 214 or 224 to attract the permanent magnet 318 and another pulse is applied to the other coil 224 or 214 to repulse the permanent magnet 318. The polarity of the voltage applied to the coils 214, 224 is reversed to move the plunger assembly 232 in the opposite direction. This has the effect of having one coil 214 or 224 attracting the permanent magnet 318 and the other coil 224 or 214 pushing the permanent magnet 318, thereby requiring less power to move the plunger assembly 232 between its two positions.

Position indication of the plunger assembly 324, and the optical element 132, is achieved by measuring the inductance of each of the coils 214, 224. The plunger assembly 324 has two possible positions corresponding to the optical element 132 being extended and retracted: with the optical element 132 extended, the assembly 324 is adjacent the upper core 212 and with the optical element 132 retracted, the assembly 324 is adjacent the lower core 222. The coil that the permanent magnet 318 is closest will have a different inductance than the other coil. In one embodiment, the relative inductance is measured by connecting the coils to a circuit that responds to changes in inductance and that responds to a measured inductance above or below a predetermined threshold value.

Figure 6:
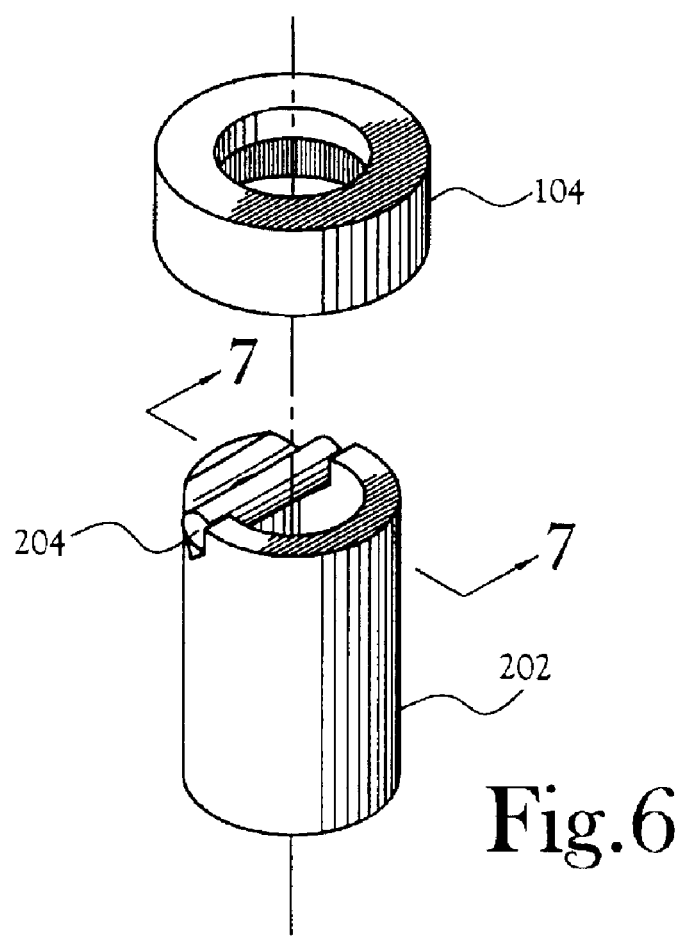
FIG. 6 is an exploded view of the stopper and shuttle cylinder.
Figure 7:
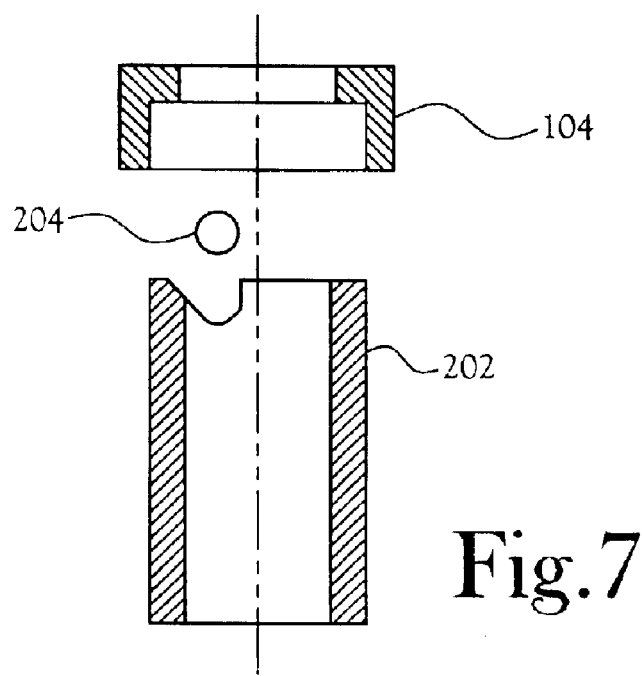
FIG. 7 is a cross-sectional view of the stopper and shuttle cylinder.

FIG. 6 illustrates the cylindrical sleeve 202, the stopper 204, and the cover 104. FIG. 7 is a cross-sectional view of the same three components. The stopper 204 is a rod-shaped member that rests in a notch cut in the cylindrical sleeve 202 and is held in position by the cover 104. In one embodiment, the stopper 204 is fixedly held in position when the cover 104 is attached to the cylindrical sleeve 202. In another embodiment, the stopper 204 is loosely held in position and when the shuttle 112 is in the extended position, the incline surface 332 forces the stopper 204 upwards and away from the longitudinal axis of the cylindrical sleeve 202 until the stopper 204 is wedged between the cover 104, the notch cut in the cylindrical sleeve 202, and the incline surface 332. The repeatability of the shuttle 112 in the extended position is assured by the stopper 204 contacting the cover 104 and the cylindrical sleeve 202 and by the incline surface 332 of the shuttle 112 contacting the stopper 204 and having the shuttle 112 rotate within the cylindrical sleeve 202 such that the incline surface 332 aligns with the stopper 204. This alignment function eliminates the need for tight tolerance between the shuttle 112 and the cylindrical sleeve 202 and results in the shuttle 112 returning to the same extended position during repeated operations with little spatial deviation.

The ends of the stopper 204 do not extend past the outside cylindrical surface of the cylindrical sleeve 202. The cover 104 fits over the end of the cylindrical sleeve 202. In one embodiment, the cover 104 is sized for an interference fit with the cylindrical sleeve 202 and the cover 104 is pressed onto the end of the cylindrical sleeve 202, thereby securing the stopper 204 in a fixed position. In another embodiment, the cover 104 is secured in place with an adhesive.

From the foregoing description, it will be recognized by those skilled in the art that an actuator 10 for linearly moving an optical element 132 has been provided. The actuator 10 has opposed coils 214, 224 that force a magnet 318 to move between two positions. The magnet 318 movement is translated to a shuttle 112 with the optical element 132. The shuttle 112 engages a stopper 204 at the extended position, which causes the shuttle 112 to stop at a fixed point with high repeatability. The stopper 204 prevents the shuttle 112 from moving longitudinally along the longitudinal axis. The stopper 204 also prevents the shuttle 112 from rotating about the longitudinal axis. Polishing the inside of the sleeve 202 and the shuttle 112 allows for low friction motion of the shuttle 112. Polishing the inside of the bearing bushing 234 and the outside surface of the bearing 316 allows for low friction motion of the plunger assembly 232. The low thermal expansion of the ceramic materials, along with the low friction surfaces and the self-aligning shuttle 112, results in high repeatability and easier alignment of the optical element 132 within an optical pathway.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An actuator for interacting with an optical pathway, said actuator comprising:

a body having a longitudinal axis and a first end;

a first electromagnet in said body; said first electromagnet including a first coil operatively associated with a first core;

a second electromagnet in said body; said second electromagnet including a second coil operatively associated with a second core;

a plunger positioned inside said body between said first electromagnet and said second electromagnet, said plunger constrained to move along said longitudinal axis between said first electromagnet and said second electromagnet;

a shuttle attached to said plunger, said shuttle having a first surface, said shuttle movable between an extended position and a retracted position;

a sleeve in fixed relation to said first end of said body, said sleeve having an inside surface, said shuttle in slideable communication with said inside surface;

a stopper in fixed relation to said sleeve, said stopper positioned to contact said first surface of said shuttle with said shuttle in said extended position whereby said shuttle is constrained from moving along said longitudinal axis and from rotating within said sleeve; and an optical element attached to said shuttle.

2. The actuator of claim 1 wherein said stopper is cylindrical.

3. The actuator of claim 1 wherein said inside surface of said sleeve and an outside surface of said shuttle have a small grain size.

4. The actuator of claim 1 wherein said sleeve and said shuttle are constructed of a ceramic material.

5. The actuator of claim 4 wherein said ceramic has a small grain size whereby an interface between said inside surface of said sleeve and an outside surface of said shuttle exhibits minimal wear.

6. The actuator of claim 1 wherein said plunger assembly includes a permanent magnet.

7. The actuator of claim 1 further including a wire connecting said plunger to said shuttle.

8. The actuator of claim 7 wherein said wire has a non-stick coating.

9. The actuator of claim 1 wherein said actuator includes a means for latching said plunger at each of a first position and a second position.

10. The actuator of claim 1 further including a bearing bushing and wherein said plunger assembly includes a bearing, said bearing in slideable communication with said bearing bushing.

11. The actuator of claim 10 wherein said bearing bushing and said bearing are constructed of a small grain size material.

12. The actuator of claim 1 wherein said optical element is attached to said shuttle with an adhesive.

13. The actuator of claim 12 wherein said adhesive has a low coefficient of thermal expansion.

14. The actuator of claim 12 wherein said adhesive has a coefficient of thermal expansion that is substantially the same as a coefficient of thermal expansion of said shuttle.

15. The actuator of claim 12 wherein said adhesive has a transition point outside a range of −40° to +85° Centigrade.

16. The actuator of claim 12 wherein said adhesive contains a plurality of micro-spheres having a substantially uniform size.

17. An actuator for interacting with an optical pathway, said actuator comprising:

a shuttle movable between an extended position and a retracted position;

an optical element attached to said shuttle, whereby said optical element interacts with the optical pathway with said shuttle in said extended position;

a driver moving said shuttle between said extended position and said retracted position, said driver including a first electromagnet and a second electromagnet, said first electromagnet and said second electromagnet operating independently; and a stopper engaging said shuttle when said shuttle is in said extended position, said stopper constraining said shuttle from moving along a longitudinal axis and from rotating about said longitudinal axis.

18. The actuator of claim 17 wherein said driver includes a plunger positioned between said first electromagnet and said second electromagnet, said plunger constrained to move between said first electromagnet and said second electromagnet, said plunger connected to said shuttle, whereby said plunger causes said shuttle to move between said extended position and said retracted position.

19. The actuator of claim 18 wherein said plunger includes a permanent magnet.

20. The actuator of claim 18 further including a wire connecting said plunger to said shuttle.

21. The actuator of claim 18 further including a wire connecting said plunger to said shuttle wherein said wire has a non-stick coating.

22. The actuator of claim 18 further including a resilient material located between said plunger and said first electromagnet.

23. The actuator of claim 18 further including a resilient material located between said plunger and said second electromagnet.

24. The actuator of claim 17 wherein said stopper is positioned to contact a surface of said shuttle with said shuttle in said extended position whereby said shuttle is constrained from moving along said longitudinal axis and from rotating about said longitudinal axis.

25. The actuator of claim 17 further including a sleeve in which said shuttle is in slideable communication, said shuttle and said sleeve each having an interface surface that has a small grain size.

26. The actuator of claim 17 further including a sleeve in which said shuttle is in slideable communication, said shuttle and said sleeve each having an interface surface that is a ceramic material.

27. The actuator of claim 17 wherein said stopper is cylindrical.

28. The actuator of claim 17 wherein said optical element is attached to said shuttle with an adhesive.

29. The actuator of claim 28 wherein said adhesive has a low coefficient of thermal expansion.

30. The actuator of claim 28 wherein said adhesive has a coefficient of thermal expansion that is substantially the same as a coefficient of thermal expansion of said shuttle.

31. The actuator of claim 28 wherein said adhesive has a transition point outside a range of −40° to +85° Centigrade.

32. The actuator of claim 28 wherein said adhesive contains a plurality of micro-spheres having a substantially uniform size.

33. An actuator for interacting with an optical pathway whereby an optical element is fixed to a shuttle that moves longitudinally within a sleeve, said actuator comprising a means for moving the shuttle between an extended position and a retracted position;

a means for latching the shuttle at each of said extended position and said retracted position; and a means for stopping the shuttle at said extended position whereby the shuttle is constrained from moving along a longitudinal axis and from rotating within the sleeve; and a means for attaching the optical element to the shuttle whereby said optical element is fixedly positioned relative to the shuttle over a selected temperature range.

34. The actuator of claim 33 further including a means for minimizing wear between the shuttle and the sleeve.

* * * * *